United States Patent [19]

Burke

[11] Patent Number: 4,850,235
[45] Date of Patent: Jul. 25, 1989

[54] VARIABLE SPEED TRACTIVE TRANSMISSION

[76] Inventor: John W. Burke, 13515 Doolittle Dr., San Leandro, Calif. 94577

[21] Appl. No.: 166,191

[22] Filed: Mar. 10, 1988

[51] Int. Cl.⁴ .............................................. F16H 15/00
[52] U.S. Cl. ...................................... 74/190; 74/191; 74/198
[58] Field of Search ................ 74/190, 191, 192, 193, 74/198, 200

[56] References Cited

U.S. PATENT DOCUMENTS

| | | | |
|---|---|---|---|
| 2,205,031 | 6/1940 | Bugden | 74/192 |
| 2,478,227 | 8/1949 | Bannister | 74/200 |
| 2,697,359 | 12/1954 | Louis | 74/193 |
| 2,734,389 | 2/1956 | Strecker | 74/200 |
| 3,410,156 | 12/1968 | Davis | 74/721 |
| 3,499,339 | 10/1970 | Moore | 74/191 |
| 3,513,714 | 5/1970 | Jennings et al. | 74/198 |
| 3,673,881 | 4/1972 | Burke | 74/198 |
| 3,837,233 | 9/1974 | French | 74/200 |

FOREIGN PATENT DOCUMENTS

| | | | |
|---|---|---|---|
| 864021 | 1/1933 | Fed. Rep. of Germany | 74/198 |
| 394334 | 11/1908 | France | 74/200 |
| 1234319 | 5/1960 | France | 74/190 |

*Primary Examiner*—Leslie A. Braun
*Assistant Examiner*—Scott Anchell

[57] ABSTRACT

This invention provides improved sensitivity and ease of movement of the speed control apparatus for tractive transmissions which employ a tilting ring in contact with concave and convex tractive surfaces. A construction is shown which eliminates the need for thrust capability in the main support bearings of shafts which carry the concave and convex members. The kinematic requirements for location of ring tilting axis is defined.

3 Claims, 4 Drawing Sheets

VARIABLE SPEED TRACTIVE TRANSMISSION

BACKGROUND OF THE INVENTION

This invention relates to improvements to the variable speed tractive transmission of U.S. Pat. No. 3,673,881, Burke, July 4, 1972, Cl 74-198, 74-200.

In this transmission variation of speed ratio is achieved by tilting the rotational axis of an intermediate ring member while the ring is in tractive contact with driving and driven members. The location of the pivot axis about which the ring is tilted has an effect on the ease and smoothness with which the ring can be moved, and therefore upon the sensitivity of speed control. It is the first object of this invention to define favorable locations for said pivot axis.

In the patent cited above, embodiments are described which permit power input and output shafts to appear at the same or at opposite ends of the transmission. In the latter case the thrust between the driving and driven tractive members is carried by the transmission casing and the moments caused by the thrust have been found to require that each shaft be supported on bearings that are spaced widely apart, both of which comprise thrust bearing capability. This bulky and complicated structure can be made more rigid and compact by mutually supporting the tractive members, each by the other and by transfer of axial force between them by a single thrust bearing. It is therefore a second object of this invention to provide an arrangement of parts which will simplify construction of the transmission for applications which require input and output shafts to be at opposite ends of the casing.

DESCRIPTION OF FIGURES

The present invention is illustrated as to a particular preferred embodiment thereof, wherein.

DESCRIPTION OF A PREFERRED EMBODIMENT

Figure 1:
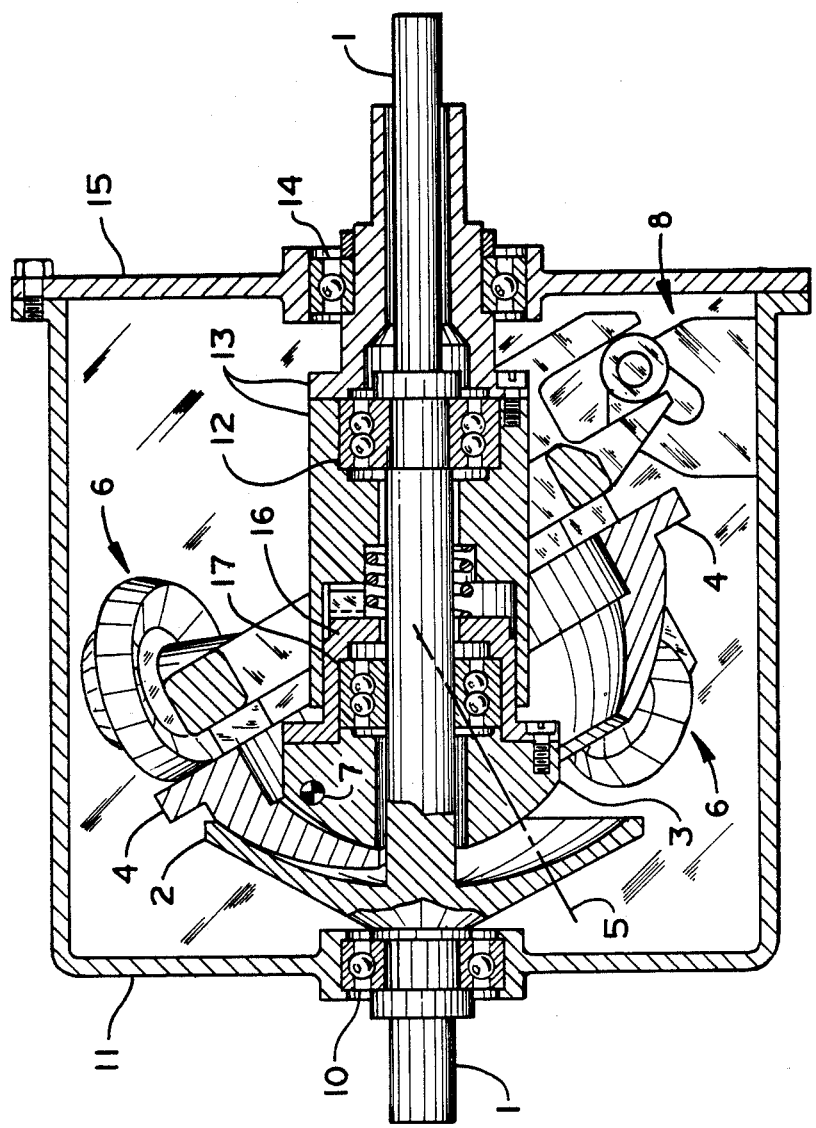
FIG. 1 is a central sectional view through a preferred embodiment of the transmission of the present invention.

Reference is made to FIG. 1, in which 1 is the input shaft and 2 is the first tractive member, called the bowl, which is integral with 1. The second tractive member 3 is called the ball and the third tractive member 4 is called the ring. The ring is free for rotation upon its own axis 5, being constrained as to position both for rotation and for variable angular alignment by a speed ratio control assembly 6 which is pivoted on an axis 7 while under control of a roller yoke mechanism 8.

Input shaft 1 is supported and axially positioned by bearing 10 which is mounted in casing 11 and by bearing 12 which is mounted in a two-part tubular shaft 13. Bearing 12 is in fixed axial relationship with shafts 1 and 13. Shaft 13 is supported by a bearing 14 which is mounted in an end cover 15 and is in slideable engagement with an intermediate member 16 to which ball 3 is attached. One or more bearings 17 are mounted inside 16 in fixed axial reladionship with 16 and in slideable engagement with shaft 1. Parts 13 and 16 are connected by mating axially slideable face cam features such that torque exerted by one member upon the other tends to force them apart with the result that an axial force is imposed on the points of contact of the tractive members in proportion to the torque. This or equivalent systems are well-known means for tractive loading modulation in metalsurface tractive transmissions.

Figure 2:
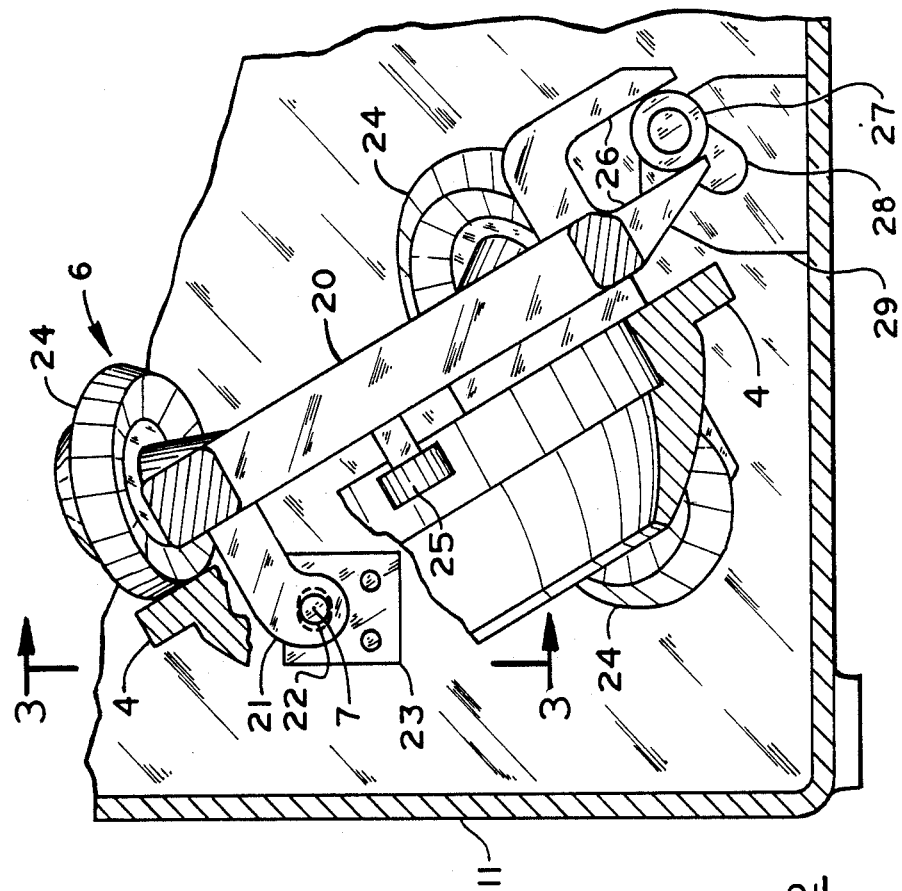
FIG. 2 is a partial central sectional view similar to FIG. 1, but showing only the ring position control means and the means by which it is supported and actuated.
Figure 3:
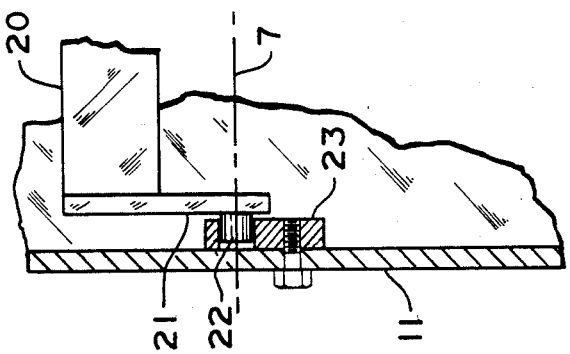
FIG. 3 is a fragmentary sectional view taken in the plane 3—3 of FIG. 2.

Now referring to FIGS. 2 and 3, the speed ratio control assembly comprises a structural frame 20 which incorporates two projecting arms 21 and pins 22 which are aligned on an axis 7 for engagement with slots in blocks 23. These blocks are fixed to casing 11 and the slots are slightly elongated to permit limited movement of frame 20 as required to accomodate axial movement of ring 4 during ratio adjustment. Axis 7 is substantially normal to a central plane which contains the axis of shaft 1. At certain points of frame 20 axles are fixed to support freely rotatable rollers 24 and 25 which are positioned to loosely abut ring 4 and confine it for free rotation in close permament relationship with frame 20. The frame also incorporates a slotted yoke 26 adapted to engage roller 27 which is journaled for free rotation upon an axle which projects from the end of a crank 28. The shaft of the crank is journaled in block 29 which is fixed to the bottom surface of the casing. The shaft projects through an opening on the far side of the casing for actuation by a lever or other control means.

Figure 4:
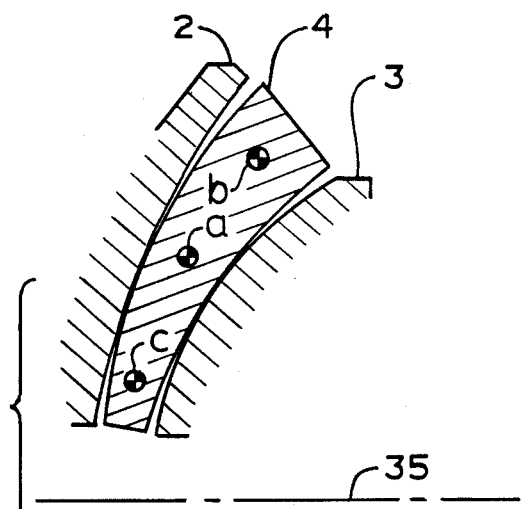
FIG. 4 is a diagram showing a cross section of the intermediate ring member in contact with driving and driven members.
Figure 6:
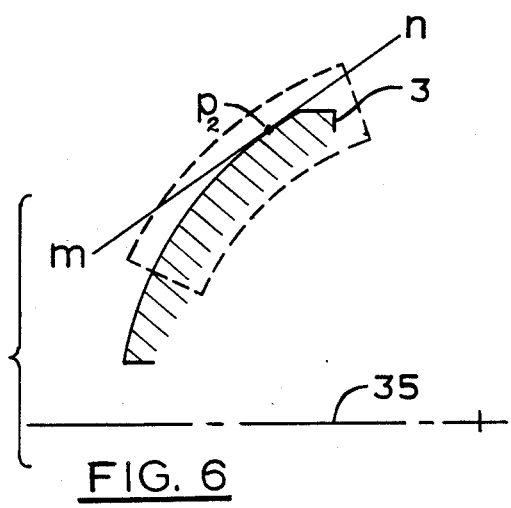
FIG. 6 is a diagram illustrating the region of more favorable locations of the ring pivot axis.
Figure 5:
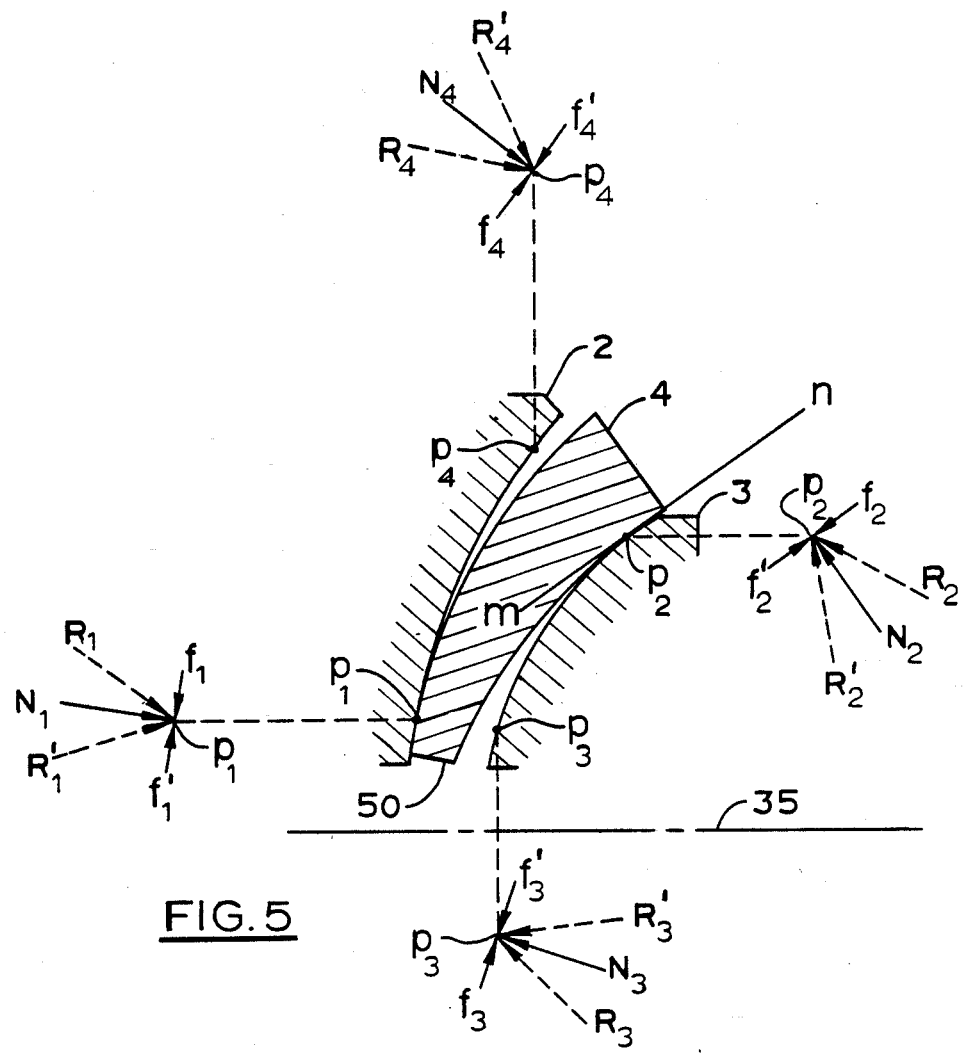
FIG. 5 is a force analysis diagram pertaining to the members shown in FIG. 4.

It has been discovered that smooth movement of the speed control assembly during alteration of the axis angle requires proper location of axis 7 with respect to both housing 11 and assembly 6. In FIGS. 4,5 and 6 are shown cross sections of tractive members 2,3 and 4 in the plane which contains their contact points and their axis of rotation. Ring 4 has the form of a curved cam interacting through a wiping contact with bowl 2, which is stationary, and with ball 3 which can only move axially. This form will be hereinafter referred to as the cam.

The cam, when changing its angular orientation must rotate about some center or a continuous succession of instant centers. Locations of the instant center, axis 7, are a matter which has a critical effect on the ease and extent of movement of the cam and on the resultant movement of the ball. In FIG. 4 the cam is shown in mid-range position and as it rotates in either direction from that position it acts as a lever which forces the ball away from the bowl. Location of axis 7 near point (a) would be favorable since excursion of the extreme points of the cam, and movement of the ball, would be a minimum. Pivoting at (b) or (c) would almost double the excursions for a given angular movement, an undesirable effect. Any of these locations, however, may prove unfavorable if the action of certain forces is considered. At any point of contact there exists a normal force on each of the surfaces, and a tangential frictional force whenever relative movement occurs. The frictional force always opposes motion of the cam. The resultant of the normal and tangential forces is a force which must be opposed by a component of the torsional effort which turns the cam. The horizontal component of the resultant is the sole influence available to move the ball against the friction of its mounting on shaft 1, and therefore to change the speed ratio setting.

Referring to FIG. 5 and inspecting extreme contact points p1, p2, p3 and p4, the four projected diagrams show how normal forces (N) on the cam are combined with tangential forces (f) which would be caused by cam rotation either to approach or to retreat from these points. Resultants R1, R1', R2, R2', R4 and R4' can all be seen to have substantial axial components of cam force available to move the ball. Location of axis 7 is therefore not a critical consideration for these points. The proportion between normal and frictional forces has been taken as 0.5 for these diagrams. This could be higher or lower, depending upon materials and other factors, but even if the proportion should become as great as 1.0 at the least favored of these three points, there would still remain sufficient axial component to move the ball. In the case of p2, however, the slope of the surfaces at the contact offers a serious threat that the resultant may not possess an axial component capable of moving the ball, but may instead retard it or actually prevent cam rotation. It is therefore necessary that rotation produce cam motion at p2 in which the frictional force is f2' and not f2, and the resultant is R2' and not R2, of which the axial component could very well be small or negative. Considering this, the instant centers of cam rotation must therefore be confined to the general region below the tangent line m-n, and not above it. It can also be seen that the farther away from p1 and the closer to axis 35 a center lying below m-n is placed, the greater will be the radial movement of the lower tip 50. This is undesirable because it forces compromise with either the diameter of shaft 1 or with the radius from 35 to point 3. Consequently, while no precise optimum location for the center can be described, the more favorable locations have been found to lie between lines which are radial from the center of the ball and form angles of 25 degrees and 70 degrees with axis 35 and which are distant from the center between 60 percent and 110 percent of the radius of the ball. This region is shown in dashed outline in FIG. 6.

In this embodiment, axis 7, being in fixed relationship only to the cam, must be free to move axially; it is for this reason that elongated slots are provided in blocks 23 for movement of pins 22.

The region here defined does not include all of the feasible locations, but does include those which will permit the smoothest cam action, particularly when the tractive members are not rotating. Axis 7 may be controlled by means other than pins located on that axis and other mechanically equivalent arrangements using linkages and rollers could be devised based upon well-known kinematic principles.

What is claimed is:

1. Improvement of a variable speed transmission comprising rotatably mounted first and second members having facing concave and convex surfaces of revolution respectively, a rotatably mounted ring disposed between said first and second members with said ring having a convex surface engaging said concave surface of said first member and a concave surface engaging said convex surface of said second member, means urging said members into contact with said ring whereby rotation of one of said members rotates the other member through said ring to vary the transmission ratio of said transmission, said improvement comprising further definition of said means controllably tilting said ring as means causing said ring to tilt about a pivot axis which is normal to a plane containing the common axis of rotation of said first and second members and at least one point of tractive contact and in which said pivot axis intersects said plane at a point which lies between lines which radiate from the center of curvature of said convex surface of said second member and which form angles of twenty-five and seventy degrees with said common axis and which lie distant from said center more than sixty percent but less than one hundred ten percent of the radius of curvature of said convex surface.

2. In a transmission according to claim 1, a first shaft substantially integral with said first member, a hollow shaft journaled upon said first shaft in fixed axial relationship with it, said second member journaled slideably on said first shaft and in keyed slideable engagement with said hollow shaft.

3. A transmission according to claim 2 in which said second member is journaled slideably on said first shaft solely by means of a double row angular contact ball bearing and in which the intersection of said common axis of rotation and any line of thrust acting normal to the surface of said second member falls between the ends of said bearing.

* * * * *